(12) United States Patent
Zhou et al.

(10) Patent No.: US 12,069,693 B2
(45) Date of Patent: *Aug. 20, 2024

(54) SEMI-STATIC OR PERIODIC TRIGGERED SEMI-STATIC OR PERIODIC OCCASION ACTIVATION

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,009

(22) Filed: Mar. 23, 2023

(65) Prior Publication Data

US 2023/0247643 A1 Aug. 3, 2023

Related U.S. Application Data

(63) Continuation of application No. 17/223,964, filed on Apr. 6, 2021, now Pat. No. 11,647,518.

(60) Provisional application No. 63/014,085, filed on Apr. 22, 2020.

(51) Int. Cl.
H04W 72/23 (2023.01)
(52) U.S. Cl.
CPC .................... H04W 72/23 (2023.01)
(58) Field of Classification Search
CPC .................................................. H04W 72/23

USPC ............................................. 370/329
See application file for complete search history.

(56) References Cited

U.S. PATENT DOCUMENTS

| 11,647,518 B2 * | 5/2023 | Zhou ............... H04W 72/23 370/329 |
|---|---|---|
| 2020/0314859 A1 | 10/2020 | Choe et al. |
| 2020/0351036 A1 | 11/2020 | Lee et al. |
| 2021/0022052 A1 | 1/2021 | Lee et al. |
| 2021/0105802 A1 | 4/2021 | Lee et al. |
| 2021/0127410 A1 | 4/2021 | Kim et al. |
| 2021/0160879 A1 | 5/2021 | Lin et al. |
| 2021/0337587 A1 | 10/2021 | Zhou |
| 2022/0140956 A1 | 5/2022 | Park et al. |
| 2022/0141883 A1 | 5/2022 | Lee et al. |
| 2022/0304033 A1 | 9/2022 | Kim et al. |

* cited by examiner

*Primary Examiner* — Peter G Solinsky
(74) *Attorney, Agent, or Firm* — Patterson & Sheridan LLP

(57) ABSTRACT

Aspects of the present disclosure relate to wireless communications, and more particularly, to mechanisms for activating semi-static or periodic occasions for communications. A method that may be performed by a user equipment (UE) includes receiving signaling configuring the UE with a set of semi-static or periodic grant occasions for communications, receiving signaling configuring at least one set of semi-static or periodic resources for downlink (DL) transmission, decoding a DL transmission on the at least one set of semi-static or periodic resources, and communicating with a network entity in grant occasions in the set of semi-static or periodic grant occasions activated based on the decoded DL transmission.

30 Claims, 12 Drawing Sheets

SEMI-STATIC OR PERIODIC TRIGGERED SEMI-STATIC OR PERIODIC OCCASION ACTIVATION

CROSS-REFERENCE TO RELATED APPLICATION(S)

This application is a continuation application of U.S. patent application Ser. No. 17/223,964, filed Apr. 6, 2021, which claims benefit of and priority to U.S. Provisional Application No. 63/014,085 filed Apr. 22, 2020, which are hereby incorporated by reference in their entireties.

BACKGROUND

Field of the Disclosure

Aspects of the present disclosure relate to wireless communications, and more particularly, to mechanisms for activating semi-static or periodic occasions for uplink (UL) or downlink (DL) communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BS s), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR technology. These improvements should be applicable to other multi-access technologies and the telecommunication standards that employ these technologies.

SUMMARY

Aspects of the present disclosure relate to wireless communications, and more particularly, to mechanisms for activating semi-static or periodic occasions for uplink (UL) or downlink (DL) communication.

Certain aspects of the present disclosure provide a method for wireless communication by a user equipment (UE). The method generally includes receiving signaling configuring the UE with a set of semi-static or periodic grant occasions for communications, receiving signaling configuring at least one set of semi-static or periodic resources for DL transmission, decoding a DL transmission on the at least one set of semi-static or periodic resources, and communicating with a network entity in grant occasions in the set of semi-static or periodic grant occasions activated based on the decoded DL transmission.

Certain aspects of the present disclosure provide a method for wireless communication by a network entity. The method generally includes transmitting signaling configuring a UE with a set of semi-static or periodic grant occasions for communications, transmitting signaling configuring the UE with at least one set of semi-static or periodic resources for DL transmission, transmitting to the UE a DL transmission on the at least one set of semi-static or periodic resources, and communicating with the UE in grant occasions in the set of semi-static or periodic grant occasions activated based on an indication that the UE decoded the DL transmission.

Certain aspects of the present disclosure can be implemented in an apparatus for wireless communication by a UE. The apparatus generally includes at least one processor and a memory coupled to the at least one processor, the memory including instructions executable by the at least one processor to cause the apparatus to: receive signaling configuring the UE with a set of semi-static or periodic grant occasions for communications, receive signaling configuring at least one set of semi-static or periodic resources for DL transmission, decode a DL transmission on the at least one set of semi-static or periodic resources, and communicate with a network entity in grant occasions in the set of semi-static or periodic grant occasions activated based on the decoded DL transmission.

Certain aspects of the present disclosure can be implemented in an apparatus for wireless communication by a network entity. The apparatus generally includes at least one processor and a memory coupled to the at least one processor, the memory including instructions executable by the at least one processor to cause the apparatus to: transmit signaling configuring a UE with a set of semi-static or periodic grant occasions for communications, transmit signaling configuring the UE with at least one set of semi-static or periodic resources for DL transmission, transmit to the UE a DL transmission on the at least one set of semi-static or periodic resources, and communicate with the UE in grant occasions in the set of semi-static or periodic grant occasions activated based on an indication that the UE decoded the DL transmission.

Certain aspects of the present disclosure can be implemented in an apparatus for wireless communication by a UE. The apparatus generally includes: means for receiving signaling configuring the UE with a set of semi-static or periodic grant occasions for communications, means for receiving signaling configuring at least one set of semi-static or periodic resources for DL transmission, means for decoding a DL transmission on the at least one set of semi-static or periodic resources, and means for communicating with a network entity in grant occasions in the set of semi-static or periodic grant occasions activated based on the decoded DL transmission.

Certain aspects of the present disclosure can be implemented in an apparatus for wireless communication by a network entity. The apparatus generally includes: means for transmitting signaling configuring a UE with a set of semi-static or periodic grant occasions for communications, means for transmitting signaling configuring the UE with at least one set of semi-static or periodic resources for DL transmission, means for transmitting to the UE a DL transmission on the at least one set of semi-static or periodic resources, and means for communicating with the UE in grant occasions in the set of semi-static or periodic grant occasions activated based on an indication that the UE decoded the DL transmission.

Certain aspects of the present disclosure can be implemented in a computer-readable medium having instructions stored thereon to cause a UE to: receive signaling configuring the UE with a set of semi-static or periodic grant occasions for communications, receive signaling configuring at least one set of semi-static or periodic resources for DL transmission, decode a DL transmission on the at least one set of semi-static or periodic resources, and communicate with a network entity in grant occasions in the set of semi-static or periodic grant occasions activated based on the decoded DL transmission.

Certain aspects of the present disclosure can be implemented in a computer-readable medium having instructions stored thereon to cause a network entity to: transmit signaling configuring a UE with a set of semi-static or periodic grant occasions for communications, transmit signaling configuring the UE with at least one set of semi-static or periodic resources for DL transmission, transmit to the UE a DL transmission on the at least one set of semi-static or periodic resources, and communicate with the UE in grant occasions in the set of semi-static or periodic grant occasions activated based on an indication that the UE decoded the DL transmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
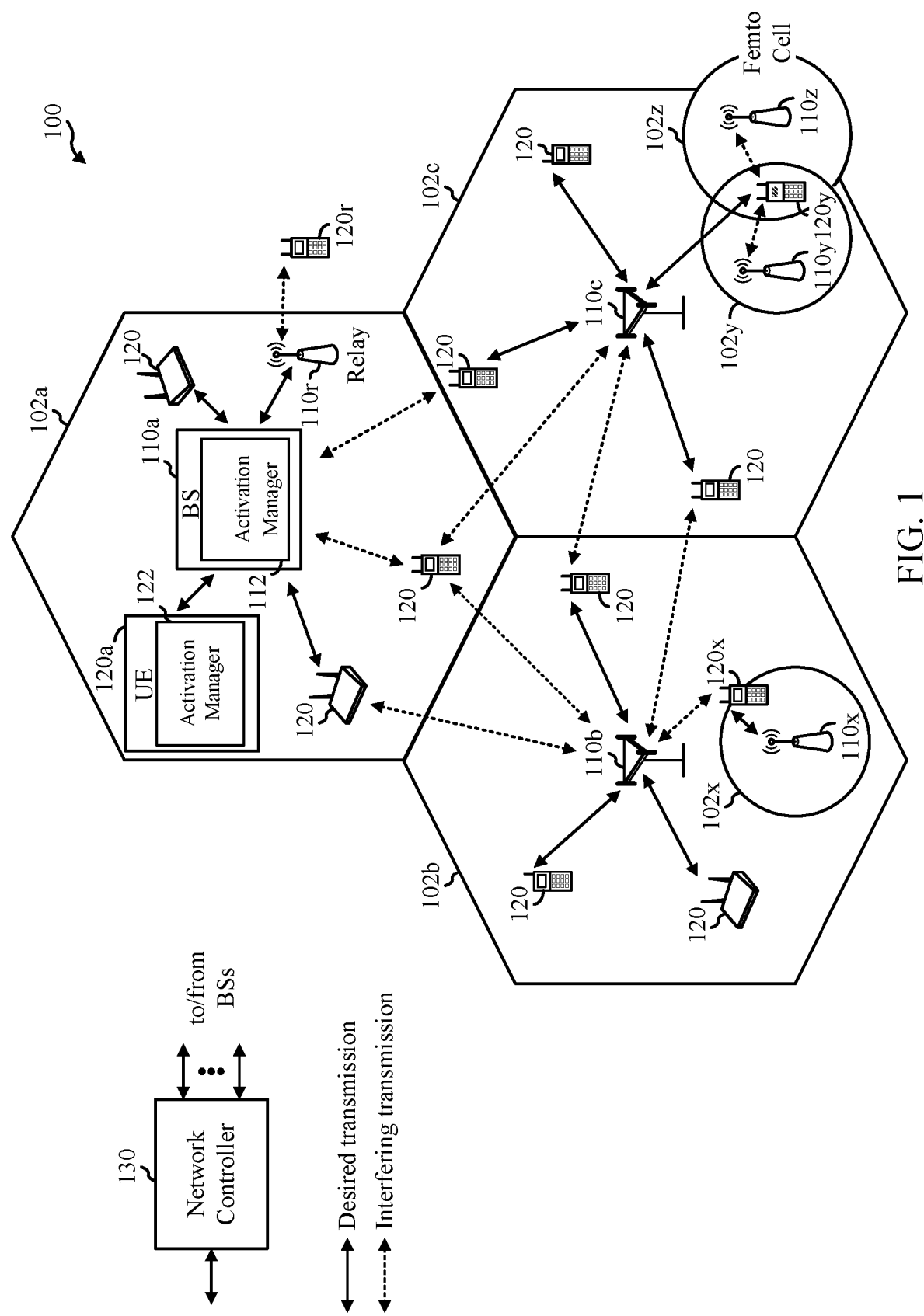
FIG. 1 is a block diagram conceptually illustrating an example telecommunications system, in accordance with certain aspects of the present disclosure.

Aspects of the present disclosure provide apparatus, methods, processing systems, and computer readable mediums for activating semi-static or periodic occasions for uplink (UL) or downlink (DL) communication.

The following description provides examples, and is not limiting of the scope, applicability, or examples set forth in the claims. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communication Networks

FIG. 1 illustrates an example wireless communication network 100 (e.g., an NR/5G network) in which aspects of the present disclosure may be performed. For example, as shown in FIG. 1, a user equipment (UE) 120a of the wireless communication network 100 has an Activation Manager 122 that may be configured to perform operations 800 of FIG. 8 to determine when to consider semi-static or periodic occasions (for uplink (UL) or downlink (DL) communications) are activated. Similarly, as shown in FIG. 1, a BS 110a of the wireless communication network 100 has an Activation Manager 112 that may be configured to perform operations 900 of FIG. 9 to activate semi-static or periodic occasions for a UE 120a (performing operations 800 of FIG. 8).

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless communication network 100 through various types of backhaul interfaces such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and transmits a transmission of the data and/or other information to a downstream station (e.g., a UE or a BS). A relay station may also be a UE that relays transmissions for other UEs or BSs. In the example shown in FIG. 1, a relay station 110r may communicate with the BS 110a and a UE 120r in order to facilitate communication between the BS 110a and the UE 120r. A relay station may also be referred to as a relay BS, a relay UE, a relay, a relay node, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the DL and/or UL. A dashed line with double arrows indicates interfering transmissions between a UE and a BS.

Certain wireless networks (e.g., LTE) utilize orthogonal frequency division multiplexing (OFDM) on the DL and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block' (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the UL and DL and include support for half-duplex operation using TDD. A single component carrier bandwidth of 100 MHz may be supported. NR RBs may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE may be functioning as a scheduling entity, and other UEs may utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. An NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases, DCells may not transmit synchronization signals—in some case DCells may transmit synchronization signals. NR BSs may transmit DL signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
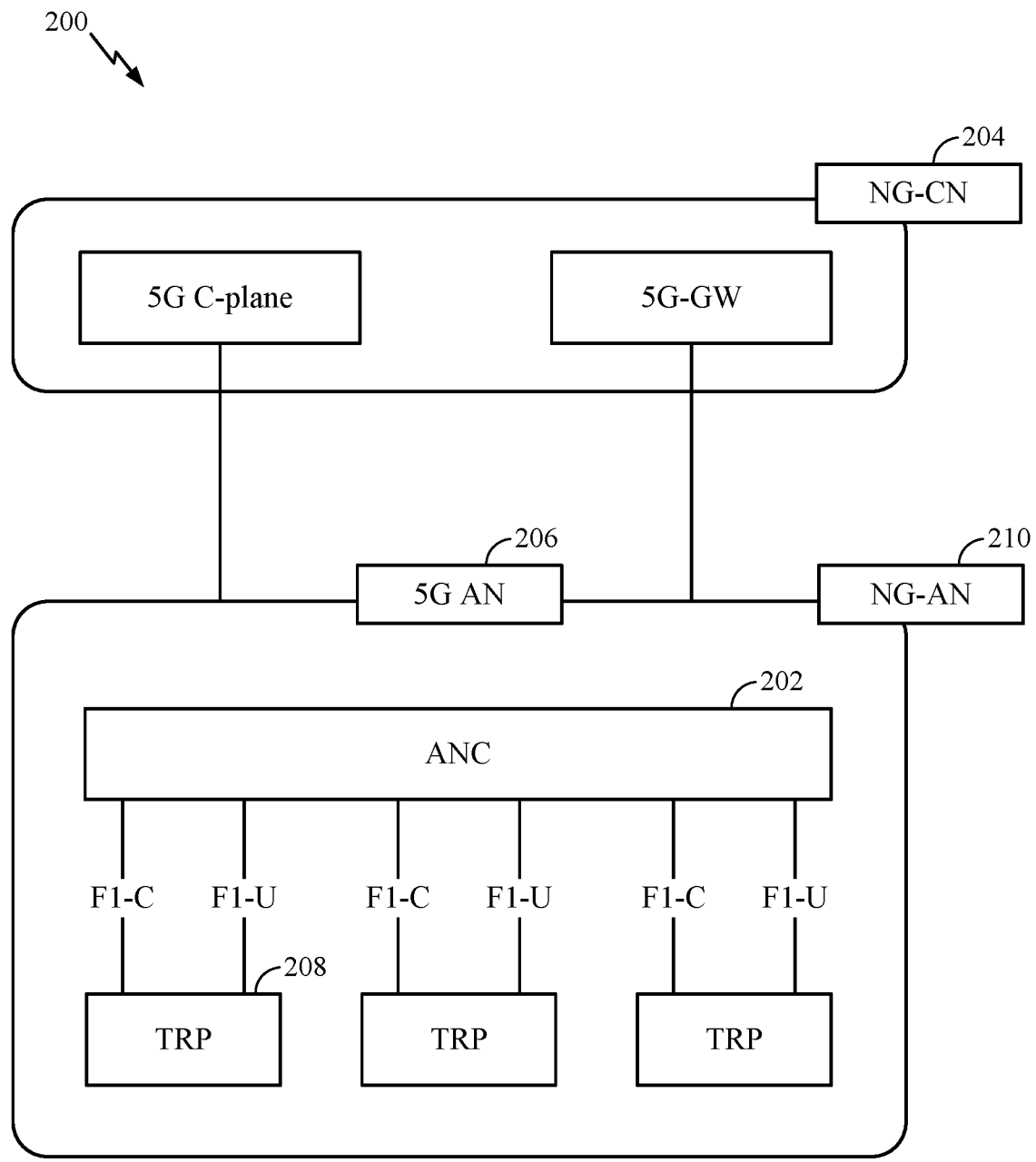
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network illustrated in FIG. 1. A 5G access node 206 may include an access node controller (ANC) 202. ANC 202 may be a CU of the distributed RAN 200. The backhaul interface to the next generation core network (NG-CN) 204 may terminate at the ANC 202. The backhaul interface to neighboring next generation access nodes (NG-ANs) 210 may terminate at ANC 202. ANC 202 may include one or more TRPs 208 (which may also be referred to as BSs, NR BSs, Node Bs, 5G NB s, APs, or some other term). As described above, a TRP may be used interchangeably with "cell."

TRPs 208 may be a DU. TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the architecture may be based on transmit network capabilities (e.g., bandwidth, latency, and/or jitter).

The logical architecture of distributed RAN 200 may share features and/or components with LTE. According to aspects, NG-AN 210 may support dual connectivity with NR. NG-AN 210 may share a common fronthaul for LTE and NR.

The logical architecture of distributed RAN 200 may enable cooperation between and among TRPs 208. For example, cooperation may be preset within a TRP and/or across TRPs via ANC 202. According to aspects, an inter-TRP interface may not be used.

According to aspects, a dynamic configuration of split logical functions may be present within the logical architecture of distributed RAN 200. As will be described in more detail with reference to FIG. 5, a Radio Resource Control (RRC) layer, Packet Data Convergence Protocol (PDCP) layer, Radio Link Control (RLC) layer, Medium Access Control (MAC) layer, and a Physical (PHY) layers may be adaptably placed at DU 9 e.g., TRP 208) or CU (e.g., ANC 202). According to certain aspects, a BS may include a central unit (CU) (e.g., ANC 202) and/or one or more DUs (e.g., one or more TRPs 208).

Figure 3:
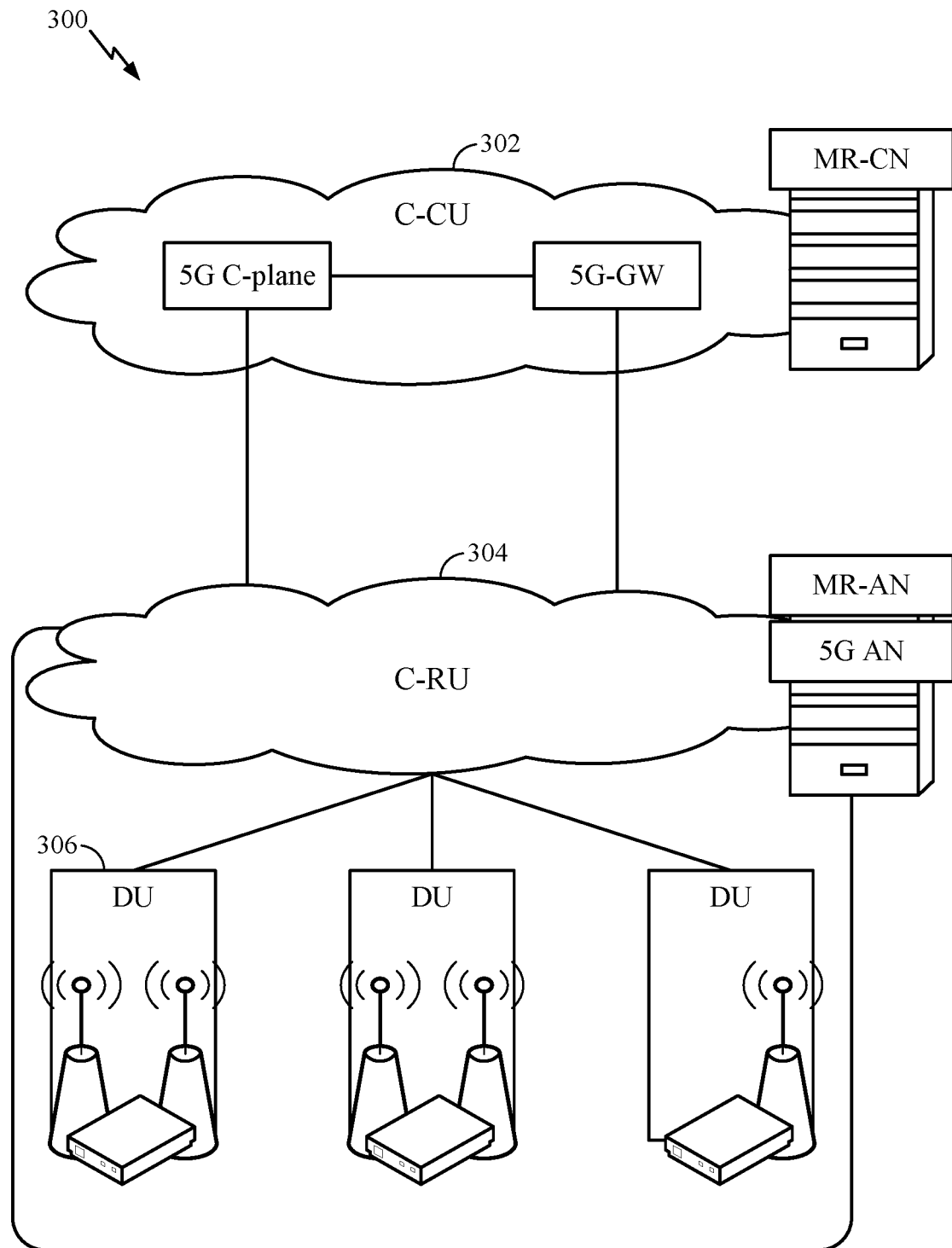
FIG. 3 is a diagram illustrating an example physical architecture of a distributed RAN, in accordance with certain aspects of the present disclosure.

FIG. 3 illustrates an example physical architecture of a distributed RAN 300, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU may have distributed deployment. The C-RU 304 may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
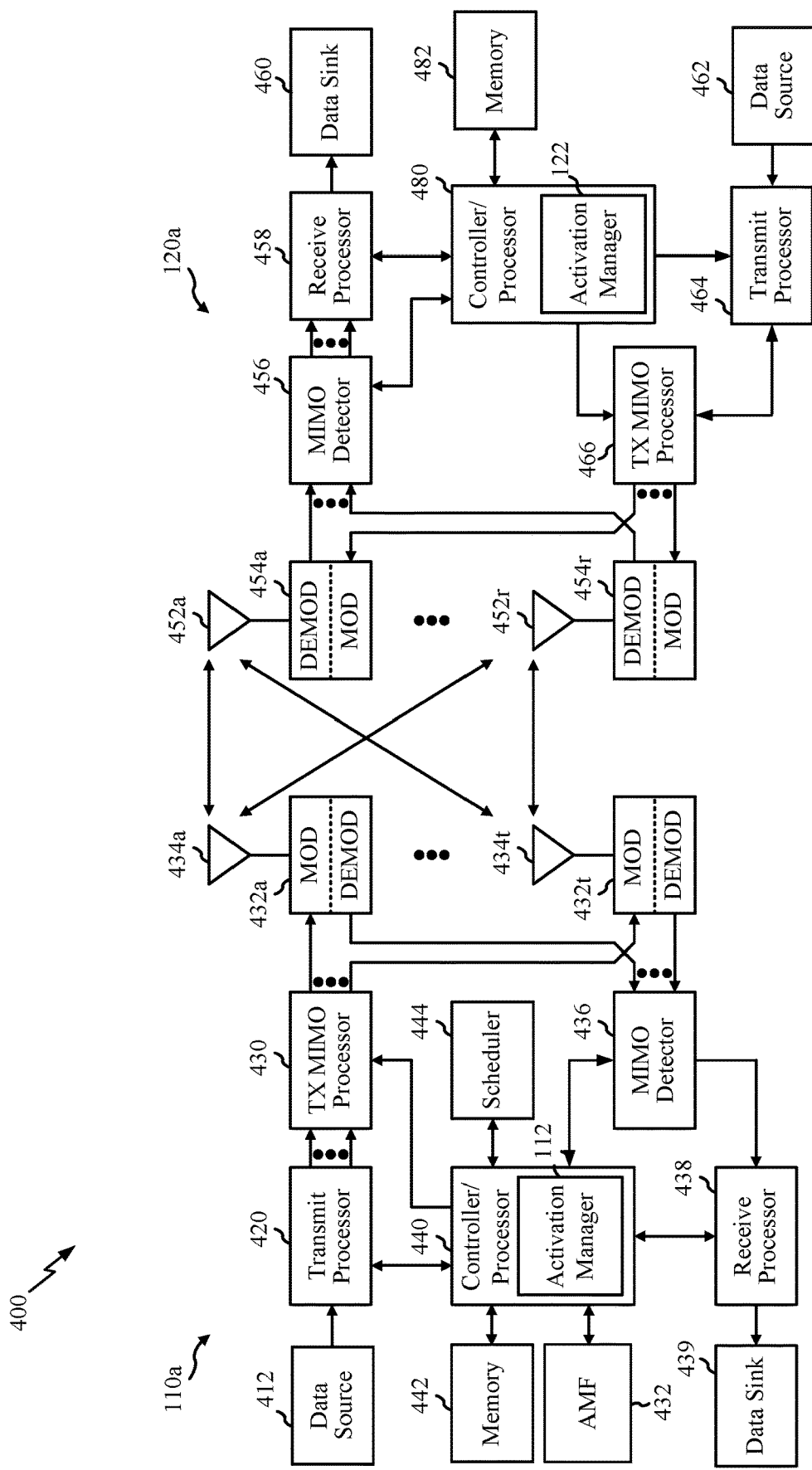
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

Figure 8:
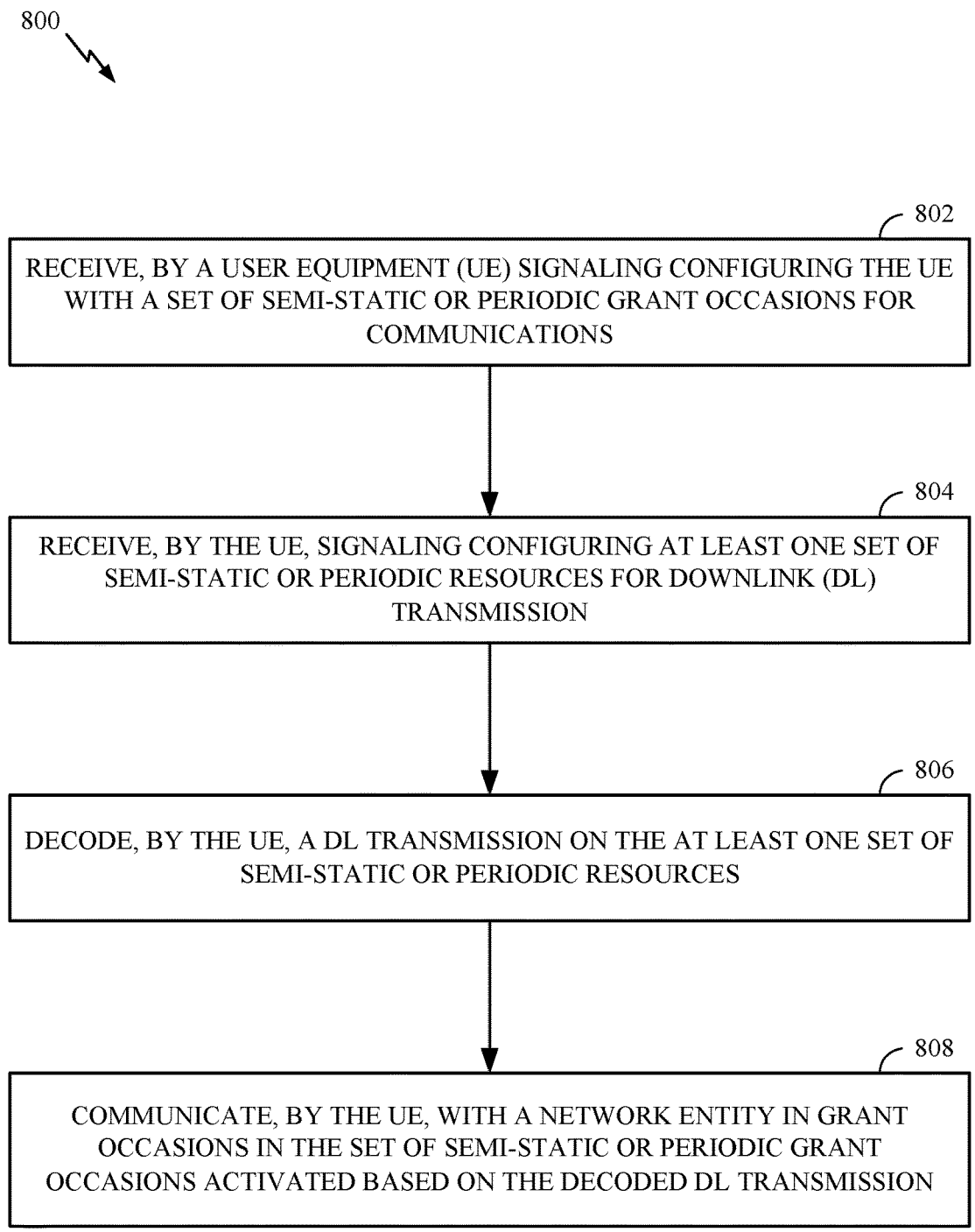
FIG. 8 illustrates example operations that may be performed by a user UE, in accordance with aspects of the present disclosure.

As an example, one or more of the antennas 452, processors 466, 458, 464, and/or controller/processor 480 of the UE 120a may be configured to perform the operations described herein (e.g., operations 800 of FIG. 8). Similarly, one or more of the antennas 434, processors 420, 430, 438 and/or controller/processor 440 of the BS 110a may be configured to perform the operations described herein (e.g., operations 900 of FIG. 9).

At the BS 110a, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), group common PDCCH (GC PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input MIMO processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a DL signal. DL signals from modulators 432a through 432t may be transmitted via the antennas 434a through 434t, respectively.

At the UE 120a, the antennas 452a through 452r may receive the DL signals from the BS 110a and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the UL, at the UE 120a, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110a. At the BS 110a, the UL signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. A scheduler 444 may schedule UEs for data transmission on the DL and/or UL. The processor 480 and/or other processors and modules at the UE 120a may perform or direct execution of the techniques described herein. As shown in FIG. 4, the controller/processor 480 of the UE 120a has an Activation Manager 122 that may be configured to perform operations 800 of FIG. 8 and/or other processes for the techniques described herein and those illustrated in the appended drawings. The processor 440 and/or other processors and modules at the BS 110a may perform or direct processes for the techniques described herein. As shown in FIG. 4, the controller/processor 440 of the BS 110a has an Activation Manager 112 that may be configured to perform operations 900 of FIG. 9 and/or other processes for the techniques described herein and those illustrated in the appended drawings. The memories 442 and 482 may store data and program codes for the BS 110a and the UE 120a, respectively.

Figure 5:
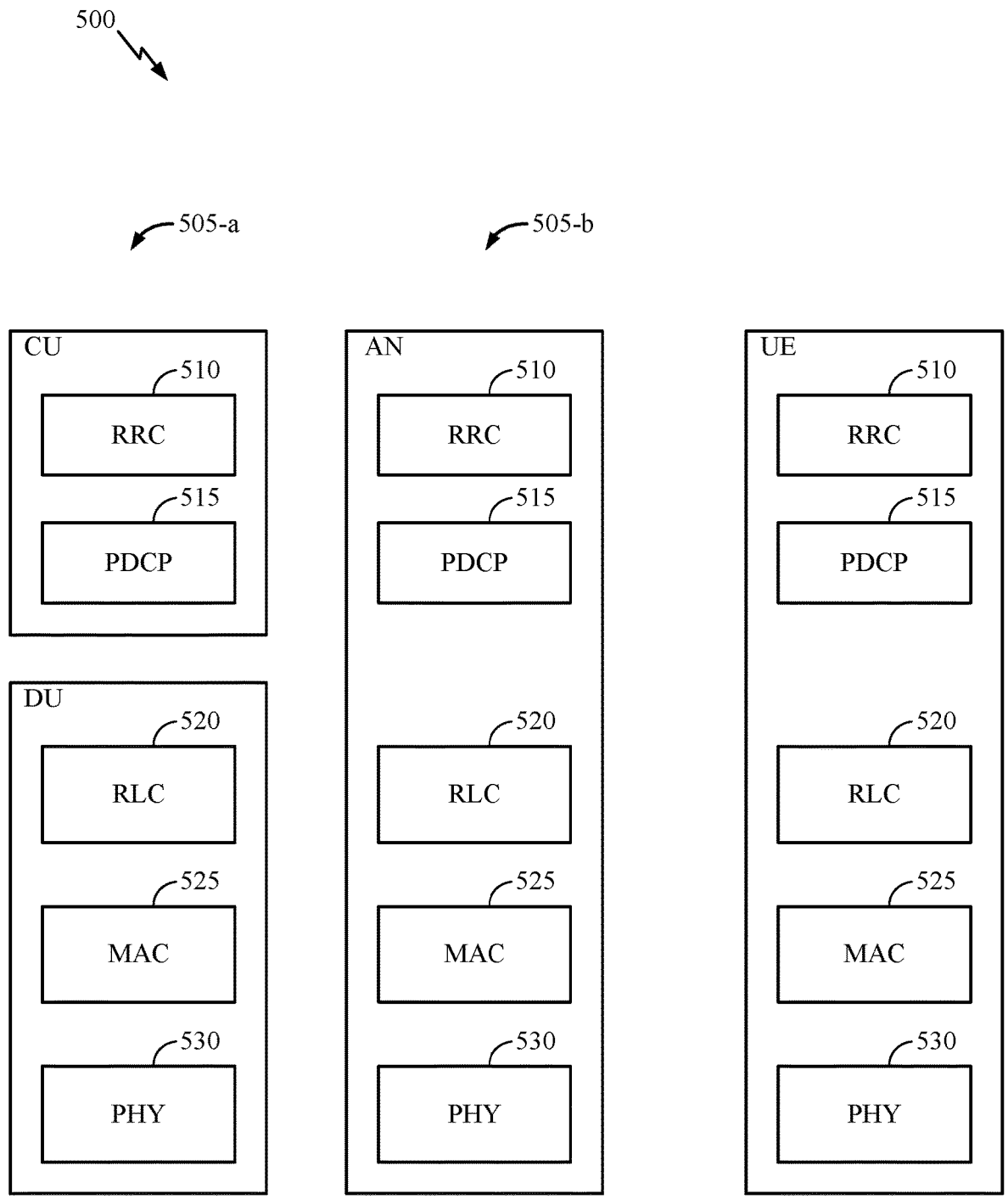
FIG. 5 is a diagram showing examples for implementing a communication protocol stack, in accordance with certain aspects of the present disclosure.

FIG. 5 illustrates a diagram 500 showing examples for implementing a communications protocol stack, in accordance with certain aspects of the present disclosure. The illustrated communications protocol stacks may be implemented by devices operating in a wireless communication system, such as a 5G system. Diagram 500 illustrates a communications protocol stack including a RRC layer 510, a PDCP layer 515, an RLC layer 520, a MAC layer 525, and a PHY layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU in FIG. 2). In the first option 505-a, an RRC layer 510 and a PDCP layer 515 may be implemented by the CU, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), NR BS, a NR NB, a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing (SCS). The NR RB is 12 consecutive frequency subcarriers. NR may support a base SCS of 15 KHz and other SCS may be defined with respect to the base SCS, for example, 30 kHz, 60 kHz, 120 kHz, 240 kHz, etc. The symbol and slot lengths scale with the SCS. The CP length also depends on the SCS.

Figure 6:
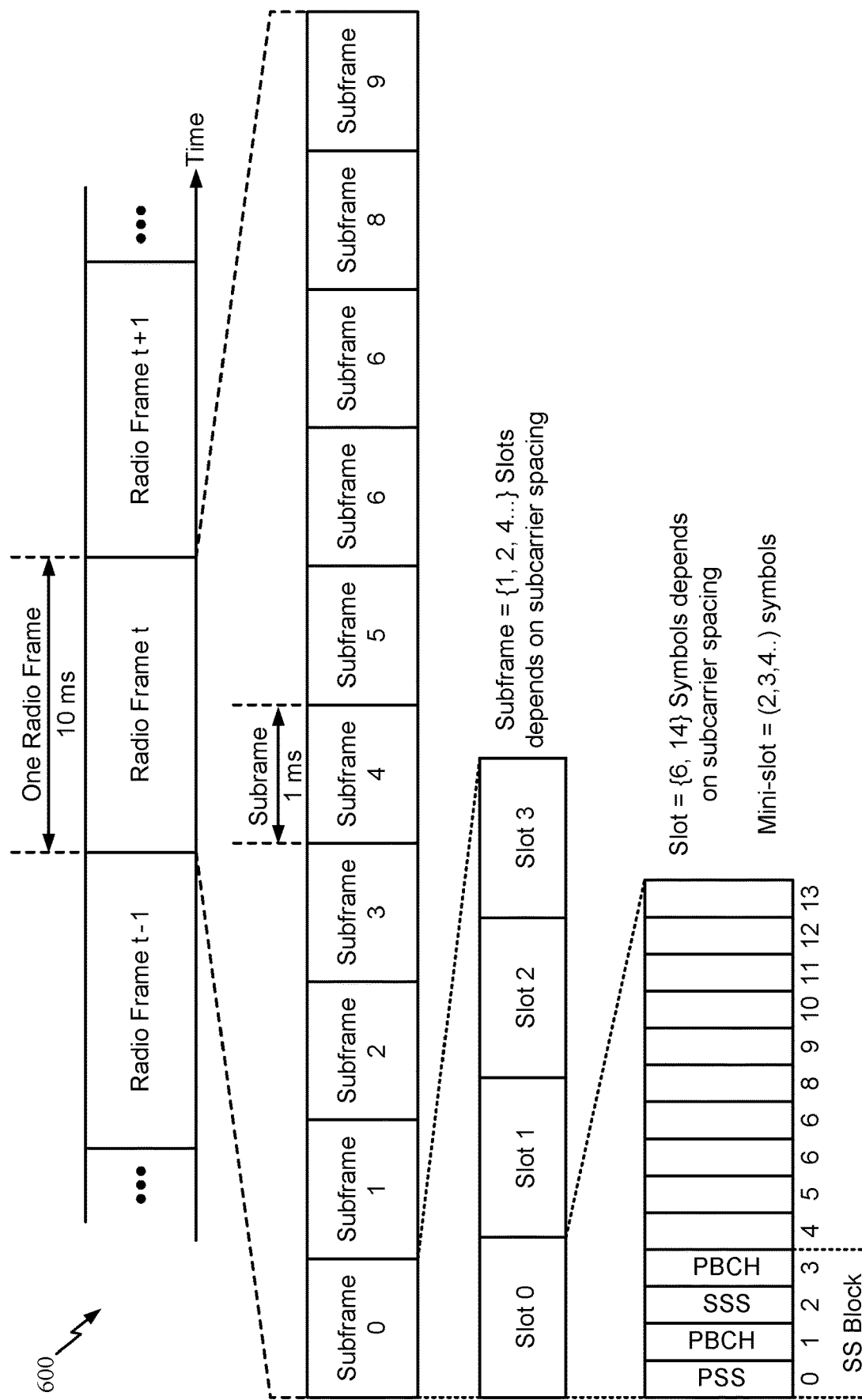
FIG. 6 illustrates an example of a frame format for a new radio (NR) system, in accordance with certain aspects of the present disclosure.

FIG. 6 is a diagram showing an example of a frame format 600 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, the SSS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of a serving cell for one or more of the UEs.

Example Semi-Static or Periodic Triggered Semi-Static or Periodic Occasion Activation Aspects of the present disclosure relate to wireless communications, and more particularly, to mechanisms allowing semi-static or periodic downlink (DL) or uplink (UL) transmissions to be activated. As an example, configured grant (CG) occasions for UL transmissions may be activated based on successful decoding of a physical downlink shared channel (PDSCH) transmission in a previous semi-persistently scheduled (SPS) occasion.

SPS resource allocation, which may also be referred to as configured DL assignment, refers to a scheduling technique where a user-equipment (UE) is pre-configured by a network entity/base station (BS) (e.g., eNBs, gNB, etc.) with a periodicity and an offset.

Figure 7:
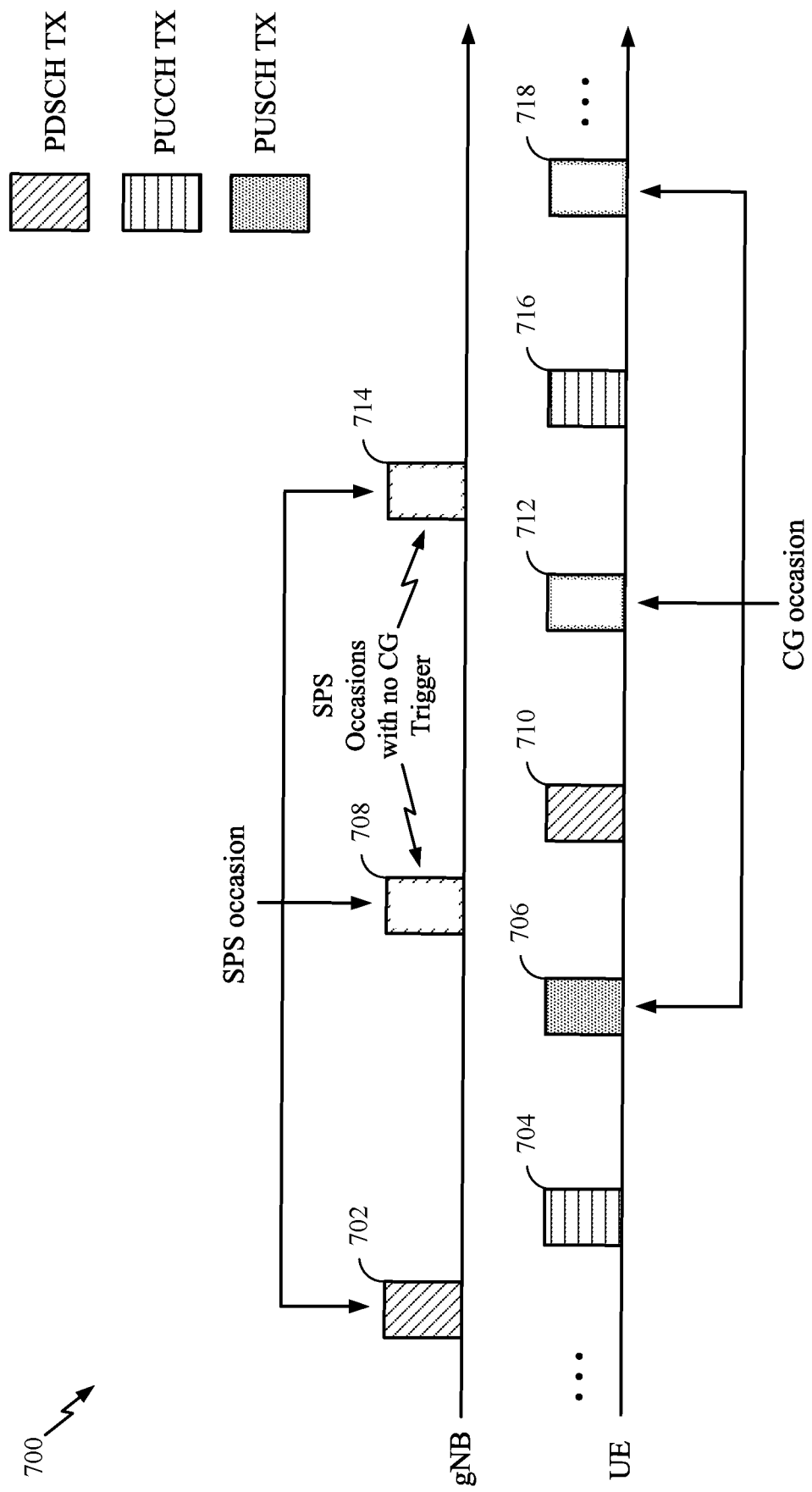
FIG. 7 illustrates an example of semi-persistent scheduled (SPS) physical downlink shared channel (PDSCH) occasions that may be used to activate configured grant (CG) occasions, in accordance with certain aspects of the present disclosure.

FIG. 7 illustrates an example of semi-persistent scheduled (SPS) physical downlink shared channel (PDSCH) occasions that may be used to activate CG occasions, in accordance with certain aspects of the present disclosure. As illustrated in FIG. 7, after a user equipment (UE) is pre-configured with a periodicity, if the UE receives an allocation of DL resources, then the allocation of SPS occasions may repeat according to the pre-configured periodicity, resulting in periodic SPS occasions. For SPS, the base station (BS) (e.g., gNB) may use Radio Resource Control (RRC) signaling to define the periodicity of configured DL assignments. Similarly, after the UE is configured with CG occasions, the allocation of CG occasions may repeat according to the pre-configured periodicity. In some cases, the DL and UL periodicity may be the same. In some cases, the DL and UL periodicity may be different.

As used herein, the term occasion generally refers to a time in which resources are allocated for a transmission that may or may not happen. For example, a DL transmission may or may not occur in an SPS occasions. An occasion may be considered activated when a transmission in the occasion is expected to occur. Accordingly, activated occasions may be monitored.

The term CG occasion generally refers to a time in which resources are allocated for UL transmission that may or may not occur. In current systems, CGs are semi-statically activated either by RRC or downlink control information (DCI) signaling. In some cases, an UL data packet in a CG occasion may be triggered by a decoded DL data packet in an SPS occasion (e.g., to report action status in response to new input/command from DL). This type of activation mechanism, however, may result in a waste of resources.

If DL data in an SPS occasion is missed, the UE may still assume that every CG occasion is available for any UL traffic (e.g., PUSCH), although the UL traffic may be low priority and delay insensitive. For example, as illustrated in FIG. 7, a DL data packet detected in an SPS occasion 702 (e.g., PDSCH occasion) and successfully decoded by a UE may trigger transmission of acknowledgement (ACK) feedback at 704. The UE may consider a first CG occasion 706 activated, based on the detected PDSCH, and transmit an UL data packet at the first CG occasion 706. However, in subsequent SPS occasions 708 and 714, DL data packets may be missed by the UE. The UE may transmit negative ACK (NACK) feedback at 710 and 716 in response to the missed DL packets. Although SPS occasions 708 and 714 include no CG trigger, the UE may still assume CG occasions 712 and 718 are available for UL traffic. Therefore, the gNB may need to reserve all CG occasions for the UE, even if no DL data is sent to solicit urgent response via UL data transmission.

Aspects of the present disclosure may help address this issue by allowing semi-static or periodic occasions (e.g., CG occasions) to be activated based on detection of a transmission on semi-static or periodic resources (e.g., SPS occasions). While examples are described herein with reference to CG occasions being activated by transmissions sent in SPS occasions, the techniques may be more generally applied to activate any type of semi-static or periodic occasions for UL or DL communications.

FIG. 8 is a flow diagram illustrating example operations 800 for wireless communication by a UE. Operations 800 may be performed, for example, by a UE 120 (e.g., UE 120a of FIG. 1 or FIG. 4) participating in communications with a BS (e.g., a gNB activating semi-static or periodic occasions according to operations 900 of FIG. 9). The operations 800 may be implemented as software components that are executed and run on one or more processors (e.g., controller/processor 480 of FIG. 4). Further, the transmission and reception of signals by the UE in operations 800 may be enabled, for example, by one or more antennas (e.g., antennas 452 of FIG. 4). In certain aspects, the transmission and/or reception of signals by the UE may be implemented via a bus interface of one or more processors (e.g., controller/processor 480 of FIG. 4) obtaining and/or outputting signals.

Operations 800 begin, at block 802, by a UE receiving signaling configuring the UE with a set of semi-static or periodic grant occasions for communications.

At block 804, the UE receives signaling configuring at least one set of semi-static or periodic resources for DL transmission.

At block 806, the UE decodes a DL transmission on the at least one set of semi-static or periodic resources.

At block 808, the UE communicates with a network entity in grant occasions in the set of semi-static or periodic grant occasions activated based on the decoded DL transmission. In some aspects, communicating with the network entity includes monitoring for DL transmission from the UE in the activated grant occasions. In some aspects, communicating with the network entity includes transmitting UL transmissions to the UE in the activated grant occasions.

Figure 9:
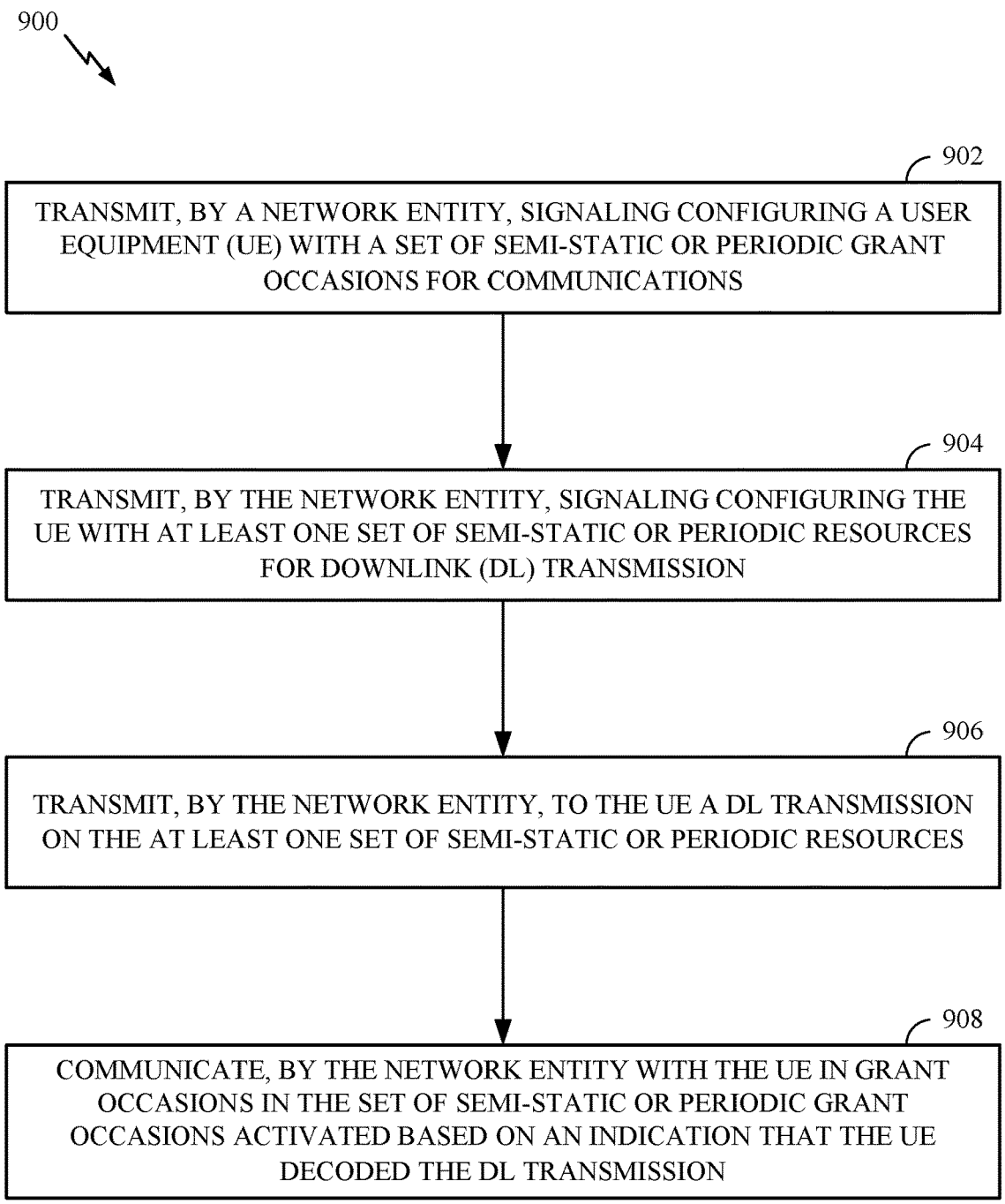
FIG. 9 illustrates example operations that may be performed by a network entity, in accordance with aspects of the present disclosure.

FIG. 9 illustrates example operations 900 that may be performed by a network entity and may be considered complementary to operations 800 of FIG. 8. For example, operations 900 may be performed by a BS (e.g., BS 110a of FIG. 1 or FIG. 4) (e.g., gNB) to activate semi-static or periodic occasions according to operations 900 of FIG. 9 for a UE (e.g., a UE performing operations 800 of FIG. 8). The operations 900 may be implemented as software components that are executed and run on one or more processors (e.g., controller/processor 440 of FIG. 4). Further, the transmission and reception of signals by the network entity in operations 900 may be enabled, for example, by one or more antennas (e.g., antennas 434 of FIG. 4). In certain aspects, the transmission and/or reception of signals by the network entity may be implemented via a bus interface of one or more processors (e.g., controller/processor 440 of FIG. 4) obtaining and/or outputting signals.

Operations 900 begin, at block 902, by a network entity transmitting signaling configuring a UE with a set of semi-static or periodic grant occasions for communications.

At block 904, the network entity transmits signaling configuring the UE with at least one set of semi-static or periodic resources for DL transmission.

At block 906, the network entity transmits to the UE a DL transmission on the at least one set of semi-static or periodic resources.

At block 908, the network entity communicates with the UE in grant occasions activated based on an indication that the UE decoded the DL transmission. In some aspects, communicating with the UE includes monitoring for UL transmission from the UE in the activated grant occasions. In some aspects, communicating with the UE includes transmitting DL transmissions to the UE in the activated grant occasions.

Figure 10:
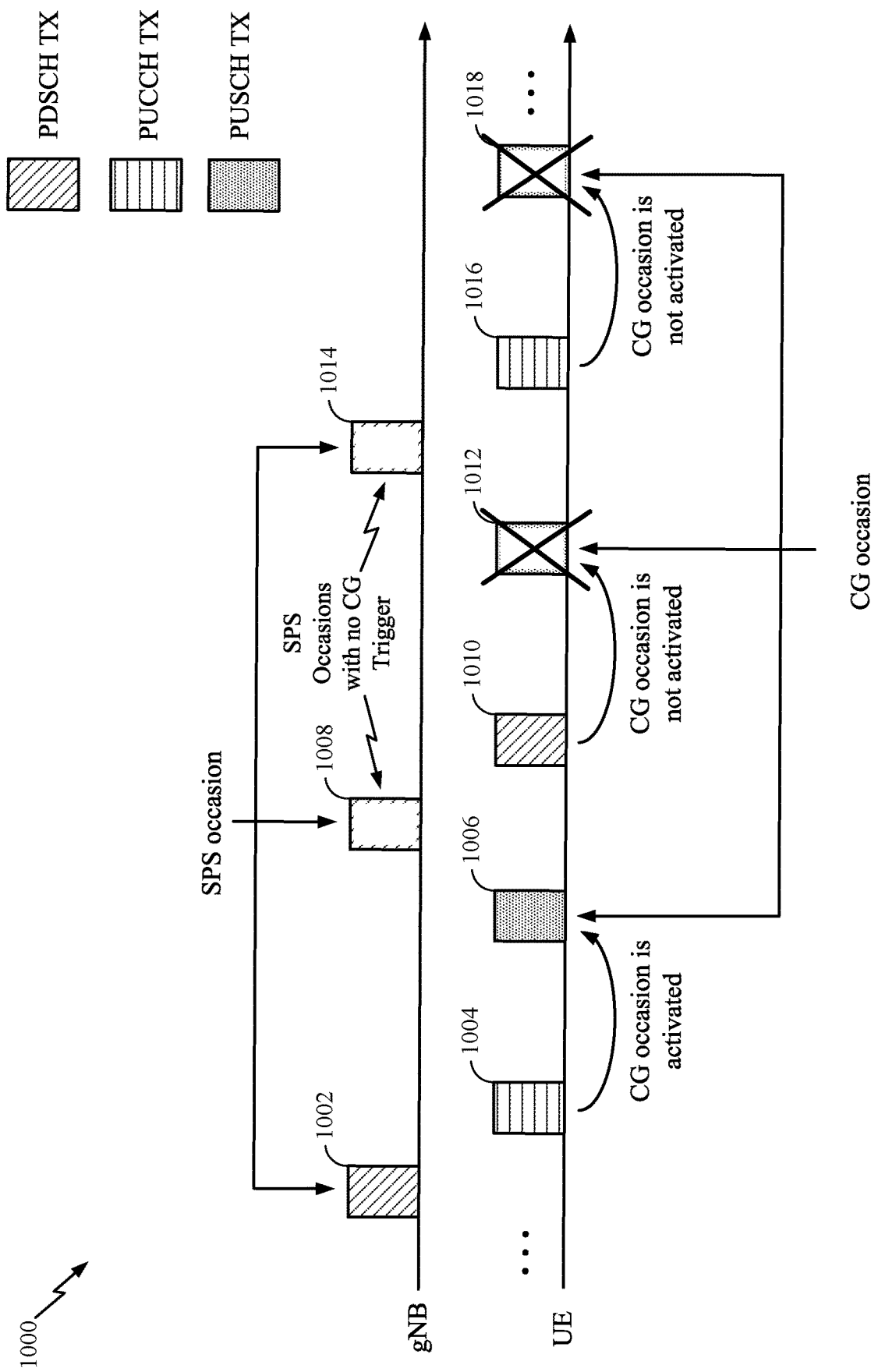
FIG. 10 illustrates an example of how CG occasions may be activated based on decoding PDSCH transmissions in SPS occasions, in accordance with certain aspects of the present disclosure.

Operations 800 and 900 of FIGS. 8 and 9 may be understood with reference to the timeline shown in FIG. 10, which illustrates how semi-static or periodic grant occasions (such as CG occasions) may be activated based on detection of DL transmissions in semi-static or periodic resources (e.g., in SPS occasions), in accordance with certain aspects of the present disclosure. The non-limiting, illustrative example of FIG. 10 may apply to cases where DL and UL periodicity is the same and cases where DL and UL periodicity is not the same.

As illustrated in FIG. 10, in some cases, CG activation may be per occasion, based on whether a PDSCH is decoded in a previous SPS occasion. In other words, a CG occasion may not be considered activated when a PDSCH transmission is not detected (and decoded) in a previous SPS occasion. As illustrated, PDSCH detected in an SPS occasion 1002 (e.g., PDSCH occasion) by a UE may trigger transmission of ACK feedback at 1004 where the PDSCH is successfully decoded. The UE may consider a first CG occasion 1006 activated, based on the detected PDSCH and at least one ACK bit indicating successful decoding, and transmit an UL data packet at the first (activated) CG occasion 1006. The UE may only consider the first CG occasion 1006 activated. Second and third CG occasions 1012 and 1018 may only be considered activated if a PDSCH is detected (and decoded) in SPS occasion 1008 and 1014, respectively. Because a PDSCH is not decoded in 1008, the UE may transmit NACK feedback at 1010 and CG occasion 1012 may not be activated. Similarly, because a PDSCH is not decoded at 1014, the UE may transmit NACK feedback at 1016 and CG occasion 1018 may not be activated.

In some cases, each SPS configuration may be associated with one CG configuration. In such cases, the association may be signaled via RRC, MAC-CE, or DCI to the UE.

According to a first option, a CG occasion may be implicitly activated by a decoded PDSCH in a previous SPS occasion. In such cases, if the PDSCH carries multiple transport blocks (TBs)/code block groups (CBGs), at least one ACK bit (indicating at least one TB/CBG was successfully decoded) can trigger the activation.

According to a second option, a CG occasion may be explicitly activated by the decoded PDSCH in a previous SPS occasion. For example, an activation command may be carried in a MAC-CE, DCI, or a data payload in the decoded PDSCH.

For both the first and second options, a gNB may explicitly indicate which CG occasion(s) is activated in the decoded PDSCH. For example, this indication may be provided via a MAC-CE/DCI in the PDSCH, or via separate signaling (e.g., an RRC message, or indicated implicitly by a rule in a standard specification). For example, a rule in a standard specification may indicate activated occasions as second and third occasions after a decoded PDSCH.

In some cases, instead of being associated with a single CG configuration, an SPS configuration may be associated with multiple CG configurations for SPS triggered CG occasion activation. Similar to the first and second options described above, CG occasion activation may be implicitly or explicitly indicated by the decoded PDSCH in an SPS occasion prior to the CG occasion(s).

Various options may be used to determine which occasion(s) in which CG configuration(s) is activated. According to one option, a gNB may explicitly indicate which occasion(s) in which CG configuration(s) is activated. For example, explicit signaling may be provided in the decoded PDSCH (e.g. MAC-CE/DCI in PDSCH) or in signaling separate from the decoded PDSCH (e.g., RRC/MAC-CE/DCI). According to another option, a rule (e.g., in a standards specification) may indicate which occasion(s) in which CG configuration(s) is activated. For example, a rule may say that the activated occasion is the earliest occasion among all associated CG configurations after the decoded PDSCH.

In some cases, instead of SPS, the CG occasion(s), or other types of semi-static or periodic occasions, may be activated by an actual transmission or its carried information over semi-statically or periodically configured transmission resources. For example, a next CG (or other type) occasion may be considered activated if a reported reference signal receive power (RSRP) in a periodic physical uplink control channel (PUCCH) occasion exceeds a threshold.

By triggering semi-static or periodic occasion activation based on detected transmissions, unused resources (e.g., that are not activated) may be re-allocated, thereby resulting in better resource utilization. Additionally, implicit activation (or deactivation) of semi-static or periodic occasions may remove the need for DCI or MAC-CE for activation. Instead, activation of a semi-static or periodic occasion may depend on transmission of ACK or NACK feedback in a previous transmission.

Figure 11:
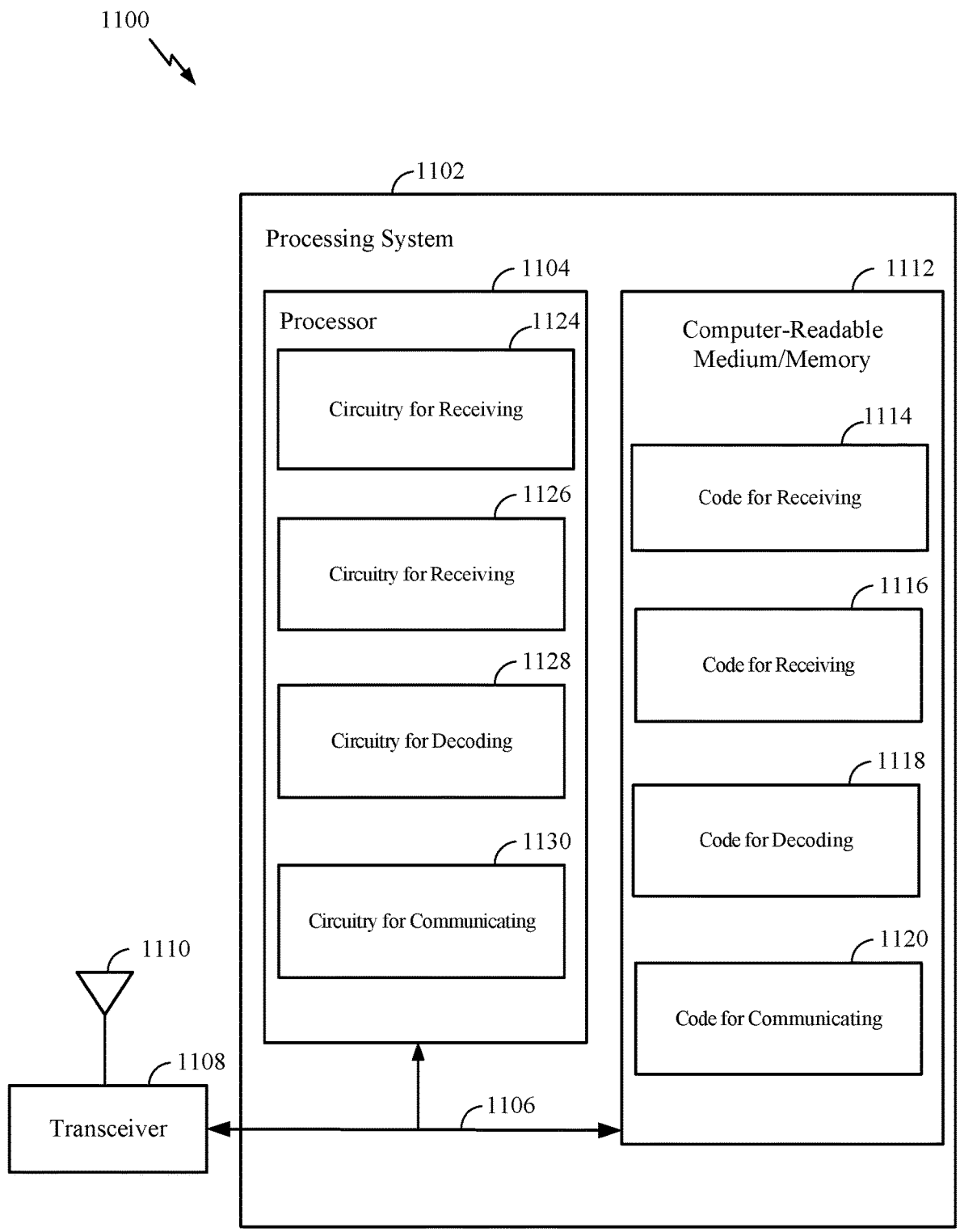
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for receiving (e.g., for receiving signaling configuring the UE with a set of semi-static or periodic grant occasions for communications); code 1116 for receiving (e.g., for receiving signaling configuring at least one set of semi-static or periodic resources for DL transmission); code 1118 for decoding (e.g., for decoding a DL transmission on the at least one set of semi-static or periodic resources); and code 1120 for communicating (e.g., for communicating with a network entity in grant occasions in the set of semi-static or periodic grant occasions activated based on the decoded DL transmission). In certain aspects, the processor 1104 has circuitry configured to implement the code stored in the computer-readable medium/memory 1112. The processor 1104 includes circuitry 1124 for receiving (e.g., for receiving signaling configuring the UE with a set of semi-static or periodic grant occasions for communications); circuitry 1126 for receiving (e.g., for receiving signaling configuring at least one set of semi-static or periodic resources for DL transmission); circuitry 1128 for decoding (e.g., for decoding a DL transmission on the at least one set of semi-static or periodic resources); and circuitry 1130 for communicating (e.g., for communicating with a network entity in grant occasions in the set of semi-static or periodic grant occasions activated based on the decoded DL transmission).

Figure 12:
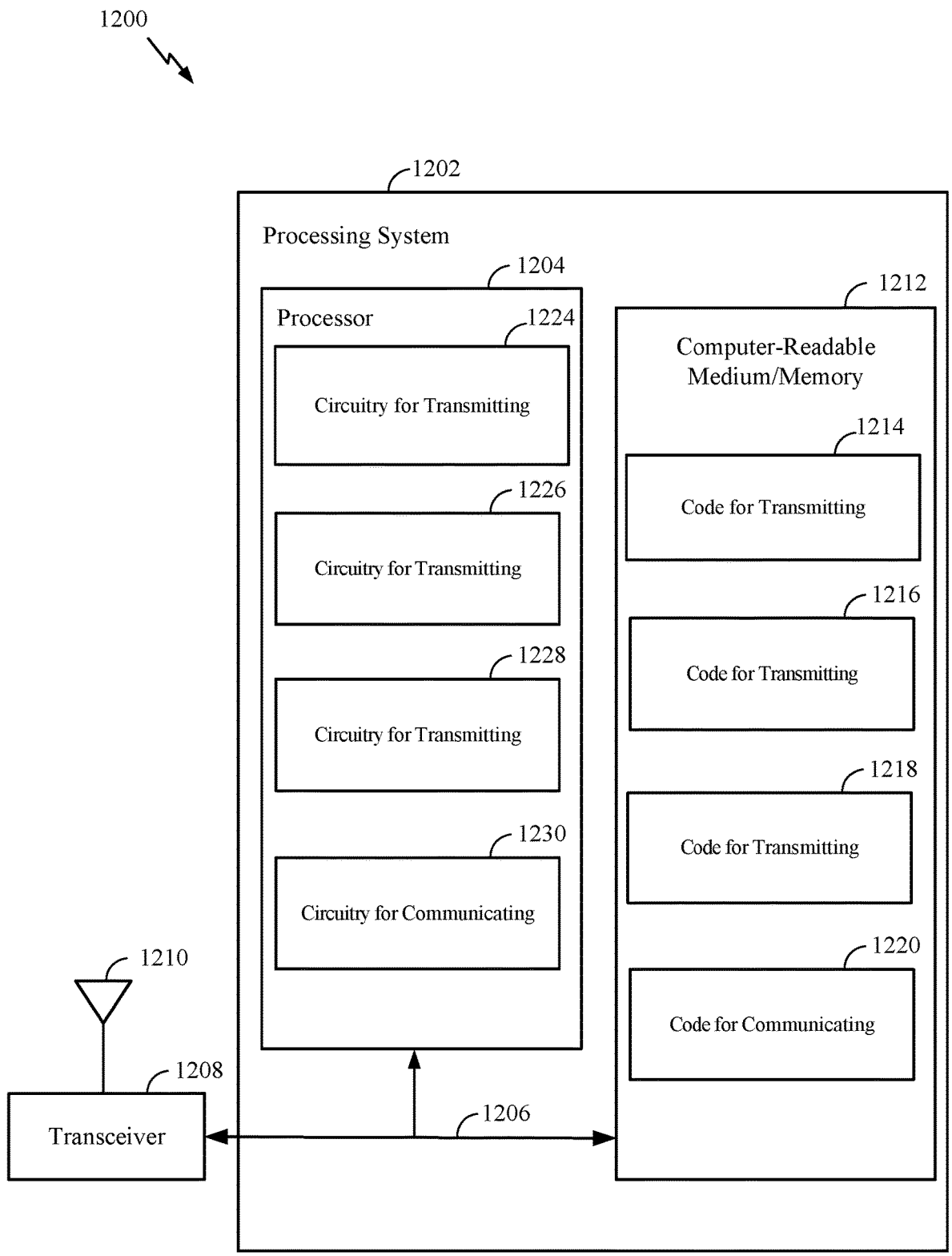
FIG. 12 illustrates a communications device that may include various components configured to perform operations for the techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for transmitting (e.g., for transmitting signaling configuring a UE with a set of semi-static or periodic grant occasions for communications); code 1216 for transmitting (e.g., for transmitting signaling configuring the UE with at least one set of semi-static or periodic resources for DL transmission); code 1218 for transmitting (e.g., transmitting to the UE a DL transmission on the at least one set of semi-static or periodic resources); and code 1220 for communicating (e.g., for communicating with the UE in grant occasions in the set of semi-static or periodic grant occasions activated based on an indication that the UE decoded the DL transmission). In certain aspects, the processor 1204 has circuitry configured to implement the code stored in the computer-readable medium/memory 1212. The processor 1204 includes circuitry 1224 for transmitting (e.g., for transmitting signaling configuring a UE with a set of semi-static or periodic grant occasions for communications); circuitry 1226 for transmitting (e.g., for transmitting signaling configuring the UE with at least one set of semi-static or periodic resources for DL transmission); circuitry 1228 for transmitting (e.g., for transmitting to the UE a DL transmission on the at least one set of semi-static or periodic resources); and circuitry 1230 for communicating (e.g., for communicating with the UE in grant occasions in the set of semi-static or periodic grant occasions activated based on an indication that the UE decoded the DL transmission).

Example Aspects

Aspect 1: An apparatus for wireless communication by a user equipment (UE), comprising: at least one processor; and a memory coupled to the at least one processor, the memory including instructions executable by the at least one processor to cause the apparatus to: receive signaling configuring the UE with a set of semi-static or periodic grant occasions for communications; receive signaling configuring at least one set of semi-static or periodic resources for downlink (DL) transmission; decode a DL transmission on the at least one set of semi-static or periodic resources; and communicate with a network entity in grant occasions activated based on the decoded DL transmission.

Aspect 2: The apparatus of Aspect 1, wherein: the set of semi-static or periodic grant occasions for communications is for DL transmission; and in order to communicate with the network entity in the activated grant occasions, the memory further includes instructions executable by the at least one processor to cause the apparatus to monitor for downlink (DL) transmissions from the UE in the activated grant occasions.

Aspect 3: The apparatus of Aspect 1 or 2, wherein: the set of semi-static or periodic grant occasions for communications is for uplink (UL) transmission; and in order to communicate with the network entity in the activated grant occasions, the memory further includes instructions executable by the at least one processor to cause the apparatus to transmit UL transmissions to the network entity in the activated grant occasions.

Aspect 4: The apparatus of Aspect 3, wherein the signaling configuring the UE with the set of semi-static or periodic grant occasions comprises signaling of one or more configured grant (CG) configurations each configuring a set of CG occasions.

Aspect 5: The apparatus of Aspect 4, wherein: the signaling configuring the UE with the at least one set of semi-static or periodic resources comprises signaling of one or more semi-persistent scheduling (SPS) configurations each configuring at least one set of SPS occasions; and wherein the UE considers one or more CG occasions of the set of CG occasions activated based on a physical downlink shared channel (PDSCH) decoded in an SPS occasion of the at least one set of SPS occasions.

Aspect 6: The apparatus of Aspect 5, wherein each SPS configuration of the one or more SPS configurations is associated with one CG configuration of the one or more CG configurations.

Aspect 7: The apparatus of Aspect 6, wherein the memory and the at least one processor are further configured to receive signaling indicating the association.

Aspect 8: The apparatus of any of Aspects 5-7, wherein the UE considers a CG occasion of the set of CG occasions implicitly activated by a decoded PDSCH in a previous SPS occasion.

Aspect 9: The apparatus of Aspect 8, wherein, when the PDSCH carries multiple transport blocks (TBs) or code block groups (CBGs), the UE considers a CG occasion of the set of CG occasions implicitly activated if at least one of the TBs or CBGs is successfully decoded.

Aspect 10: The apparatus of any of Aspects 5-9, wherein the UE considers a CG occasion of the set of CG occasions implicitly activated based, at least in part, on explicit signaling provided in a decoded PDSCH in a previous SPS occasion or a downlink control information (DCI) that scheduled the decoded PDSCH.

Aspect 11: The apparatus of Aspect 10, wherein, the explicit signaling is carried via a medium access control (MAC) control element (CE).

Aspect 12: The apparatus of Aspect 10 or 11, wherein, the explicit signaling is carried via the DCI.

Aspect 13: The apparatus of any of Aspects 10-12, wherein, the explicit signaling is carried via data payload in the PDSCH.

Aspect 14: The apparatus of any of Aspects 5-13, wherein the UE considers a CG occasion of the set of CG occasions activated based, at least in part, on explicit signaling.

Aspect 15: The apparatus of Aspect 14, wherein the explicit signaling is provided in at least one of: the decoded PDSCH or via signaling separate from the PDSCH.

Aspect 16: The apparatus of any of Aspects 6-15, wherein multiple CG occasions of the set of CG occasions after the decoded PDSCH are activated.

Aspect 17: The apparatus of any of Aspects 5-16, wherein at least one SPS configuration of the one or more SPS configurations is associated with multiple CG configurations.

Aspect 18: The apparatus of any of Aspect 17, wherein the UE considers a CG occasion of the set of CG occasions activated based on explicit signaling.

Aspect 19: The apparatus of Aspect 18, wherein the explicit signaling is provided in at least one of: the decoded PDSCH or via separate signaling separate from the PDSCH.

Aspect 20: The apparatus of any of any of Aspects 17-19, wherein the UE considers a CG occasion of the set of CG occasions activated implicitly.

Aspect 21: The apparatus of Aspect 18, wherein the UE implicitly determines that an activated CG occasion is an earliest occasion among all CG occasions after the decoded PDSCH.

Aspect 22: The apparatus of any of Aspects 1-21, wherein one or more grant occasions in the set of semi-static or periodic grant occasions are activated by a DL transmission or information carried in the DL transmission.

Aspect 23: The apparatus of Aspect 22, wherein one or more grant occasions are considered activated when a reference signal receive power (RSRP) of the DL transmission reported in a periodic physical uplink control channel (PUCCH) occasion exceeds a threshold value.

Aspect 24: An apparatus for wireless communication by a network entity, comprising: at least one processor; and a memory coupled to the at least one processor, the memory including instructions executable by the at least one processor to cause the apparatus to: transmit signaling configuring a user equipment (UE) with a set of semi-static or periodic grant occasions for communications; transmit signaling configuring the UE with at least one set of semi-static or periodic resources for downlink (DL) transmission; transmit to the UE a DL transmission on the at least one set of semi-static or periodic resources; and communicate with the UE in grant occasions in the set of semi-static or periodic grant occasions activated based on an indication that the UE decoded the DL transmission.

Aspect 25: The apparatus of Aspect 24, wherein: the set of semi-static or periodic grant occasions for communications is for DL transmission; and in order to communicate with the UE in the activated grant occasions, the memory further includes instructions executable by the at least one processor to cause the apparatus to transmit DL transmissions to the UE in the activated grant occasions.

Aspect 26: The apparatus of Aspect 24 or 25, wherein: the set of semi-static or periodic CG occasions for communications is for uplink (UL) transmission; and in order to communicate with the UE in the activated grant occasions, the memory further includes instructions executable by the at least one processor to cause the apparatus to monitor for uplink (UL) transmission from the UE in the activated grant occasions.

Aspect 27: The apparatus of any of Aspects 24-26, wherein the signaling configuring the UE with the set of semi-static or periodic occasions comprises signaling of one or more configured grant (CG) configurations each configuring a set of CG occasions.

Aspect 28: The apparatus of Aspect 27, wherein: the signaling configuring the UE with the at least one set of semi-static or periodic resources comprises signaling of one or more semi-persistent scheduling (SPS) configurations each configuring at least one set of SPS occasions; and wherein the network entity considers one or more CG occasions of the set of CG occasions activated based on a physical downlink shared channel (PDSCH) decoded in an SPS occasion of the at least one set of SPS occasions.

Aspect 29: A method for wireless communication by a user equipment (UE), comprising: receiving signaling of one or more configured grant (CG) configurations each configuring the UE with a set of semi-static or periodic CG occasions for communications; receiving signaling configuring at least one set of semi-static or periodic resources for downlink (DL) transmission; decoding a DL transmission on the at least one set of semi-static or periodic resources; and communicating with a network entity in CG occasions in the set of semi-static or periodic CG occasions activated based on the decoded DL transmission.

Aspect 30: A method for wireless communication by a network entity, comprising: transmitting signaling of one or more configured grant (CG) configurations each configuring a user equipment (UE) with a set of semi-static or periodic CG occasions for communications; transmitting signaling configuring the UE with at least one set of semi-static or periodic resources for downlink (DL) transmission; transmitting to the UE a DL transmission on the at least one set of semi-static or periodic resources; and communicating with the UE in CG occasions in the set of semi-static or periodic CG occasions activated based on an indication that the UE decoded the DL transmission.

Additional Considerations

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication by a user equipment (UE), comprising:
at least one processor; and
a memory coupled to the at least one processor, the memory including instructions executable by the at least one processor to cause the apparatus to:
receive signaling configuring the UE with a set of semi-static or periodic grant occasions for communications;
receive signaling configuring the UE with a set of semi-static or periodic resources for a set of downlink (DL) transmissions;
decode a DL transmission on at least one of the set of semi-static or periodic resources; and
communicate with a network entity in a subset of periodic grant occasions within the set of semi-static or periodic grant occasions, wherein the subset of periodic grant occasions are implicitly activated based on the DL transmission.

2. The apparatus of claim 1, wherein:
the set of semi-static or periodic grant occasions for communications is for the set of DL transmissions; and
in order to communicate with the network entity in the activated subset of periodic grant occasions, the memory further includes instructions executable by the at least one processor to cause the apparatus to monitor for DL transmissions from the UE in the activated subset of periodic grant occasions.

3. The apparatus of claim 1, wherein:
the set of semi-static or periodic grant occasions for communications is for uplink (UL) transmissions; and
in order to communicate with the network entity in the activated subset of periodic grant occasions, the memory further includes instructions executable by the at least one processor to cause the apparatus to transmit UL transmissions to the network entity in the activated subset of periodic grant occasions.

4. The apparatus of claim 3, wherein the signaling configuring the UE with the set of semi-static or periodic grant occasions comprises signaling of one or more configured grant (CG) configurations each configuring a set of CG occasions.

5. The apparatus of claim 4, wherein:
the signaling configuring the UE with the set of semi-static or periodic resources comprises signaling of one or more semi-persistent scheduling (SPS) configurations each configuring a set of SPS occasions; and
wherein the memory further includes instructions executable by the at least one processor to cause the apparatus to consider one or more CG occasions of the set of CG occasions activated based on a physical downlink shared channel (PDSCH) decoded in an SPS occasion of the set of SPS occasions.

6. The apparatus of claim 5, wherein each SPS configuration of the one or more SPS configurations is associated with one CG configuration of the one or more CG configurations.

7. The apparatus of claim 6, wherein the memory further includes instructions executable by the at least one processor to cause the apparatus to receive signaling indicating association of each SPS configuration of the one or more SPS configurations with one CG configuration of the one or more CG configurations.

8. The apparatus of claim 5, wherein the memory further includes instructions executable by the at least one processor to cause the apparatus to consider a CG occasion of the set of CG occasions implicitly activated by the decoded PDSCH in a previous SPS occasion.

9. The apparatus of claim 8, wherein, when the PDSCH carries multiple transport blocks (TBs) or code block groups (CBGs), the memory further includes instructions executable by the at least one processor to cause the apparatus to consider a CG occasion of the set of CG occasions implicitly activated if at least one of the TBs or CBGs is successfully decoded.

10. The apparatus of claim 5, wherein the memory further includes instructions executable by the at least one processor to cause the apparatus to consider a CG occasion of the set of CG occasions implicitly activated based, at least in part, on explicit signaling provided in the decoded PDSCH in a previous SPS occasion or a downlink control information (DCI) that scheduled the decoded PDSCH.

11. The apparatus of claim 10, wherein the explicit signaling is carried via a medium access control (MAC) control element (CE).

12. The apparatus of claim 10, wherein the explicit signaling is carried via the DCI.

13. The apparatus of claim 10, wherein the explicit signaling is carried via a data payload in the PDSCH.

14. The apparatus of claim 5, wherein the memory further includes instructions executable by the at least one processor to cause the apparatus to consider a CG occasion of the set of CG occasions activated based, at least in part, on explicit signaling.

15. The apparatus of claim 14, wherein the explicit signaling is provided in at least one of: the PDSCH or via signaling separate from the PDSCH.

16. The apparatus of claim 6, wherein multiple CG occasions of the set of CG occasions after the decoded PDSCH are activated.

17. The apparatus of claim 5, wherein at least one SPS configuration of the one or more SPS configurations is associated with multiple CG configurations.

18. The apparatus of claim 17, wherein the memory further includes instructions executable by the at least one processor to cause the apparatus to consider a CG occasion of the set of CG occasions activated based on explicit signaling.

19. The apparatus of claim 18, wherein the explicit signaling is provided in at least one of: the PDSCH or via signaling separate from the PDSCH.

20. The apparatus of claim 17, wherein the memory further includes instructions executable by the at least one processor to cause the apparatus to consider a CG occasion of the set of CG occasions activated implicitly.

21. The apparatus of claim 20, wherein the memory further includes instructions executable by the at least one processor to cause the apparatus to implicitly determine that an activated CG occasion is an earliest occasion among all CG occasions after the decoded PDSCH.

22. The apparatus of claim 1, wherein one or more grant occasions in the set of semi-static or periodic grant occasions are activated by the DL transmission or information carried in the DL transmission.

23. The apparatus of claim 22, wherein the one or more grant occasions are considered activated when a reference signal receive power (RSRP) of the DL transmission reported in a periodic physical uplink control channel (PUCCH) occasion exceeds a threshold value.

24. An apparatus for wireless communication by a network entity, comprising:
at least one processor; and
a memory coupled to the at least one processor, the memory including instructions executable by the at least one processor to cause the apparatus to:
transmit signaling configuring a user equipment (UE) with a set of semi-static or periodic grant occasions for communications;
transmit signaling configuring the UE with a set of semi-static or periodic resources for a set of downlink (DL) transmissions;
transmit to the UE a DL transmission on at least one of the set of semi-static or periodic resources; and
communicate with the UE in a subset of periodic grant occasions within the set of semi-static or periodic grant occasions, wherein the subset of periodic grant occasions are implicitly activated based on the DL transmission.

25. The apparatus of claim 24, wherein:
the set of semi-static or periodic grant occasions for communications is for the set of DL transmissions; and
in order to communicate with the UE in the activated subset of periodic grant occasions, the memory further includes instructions executable by the at least one processor to cause the apparatus to transmit DL transmissions to the UE in the activated subset of periodic grant occasions.

26. The apparatus of claim 24, wherein:
the set of semi-static or periodic grant occasions for communications is for uplink (UL) transmissions; and
in order to communicate with the UE in the activated subset of periodic grant occasions, the memory further includes instructions executable by the at least one processor to cause the apparatus to monitor for UL transmission from the UE in the activated subset of periodic grant occasions.

27. The apparatus of claim 24, wherein the signaling configuring the UE with the set of semi-static or periodic grant occasions comprises signaling of one or more configured grant (CG) configurations each configuring a set of CG occasions.

28. The apparatus of claim 27, wherein:
the signaling configuring the UE with the set of semi-static or periodic resources comprises signaling of one or more semi-persistent scheduling (SPS) configurations each configuring at least one set of SPS occasions; and
wherein the memory further includes instructions executable by the at least one processor to cause the apparatus to consider one or more CG occasions of the set of CG occasions activated based on a physical downlink shared channel (PDSCH) decoded in an SPS occasion of the at least one set of SPS occasions.

29. A method for wireless communication by a user equipment (UE), comprising:
receiving signaling configuring the UE with a set of semi-static or periodic grant occasions for communications;
receiving signaling configuring the UE with a set of semi-static or periodic resources for a set of downlink (DL) transmissions;
decoding a DL transmission on at least one of the set of semi-static or periodic resources; and
communicating with a network entity in a subset of periodic grant occasions within the set of semi-static or periodic grant occasions activated, wherein the subset of periodic grant occasions are implicitly based on the DL transmission.

30. A method for wireless communication by a network entity, comprising:
transmitting signaling configuring a user equipment (UE) with a set of semi-static or periodic grant occasions for communications;
transmitting signaling configuring the UE with a set of semi-static or periodic resources for a set of downlink (DL) transmissions;
transmitting to the UE a DL transmission on at least one of the set of semi-static or periodic resources; and communicating with the UE in a subset of periodic grant occasions within the set of semi-static or periodic grant occasions, wherein the subset of periodic grant occasions are implicitly activated based on the DL transmission.

* * * * *